May 26, 1953      E. I. BIEHLS      2,639,658
BUTTER MELTING AND APPLICATOR UNIT FOR BREAD TOASTERS
Filed April 4, 1952
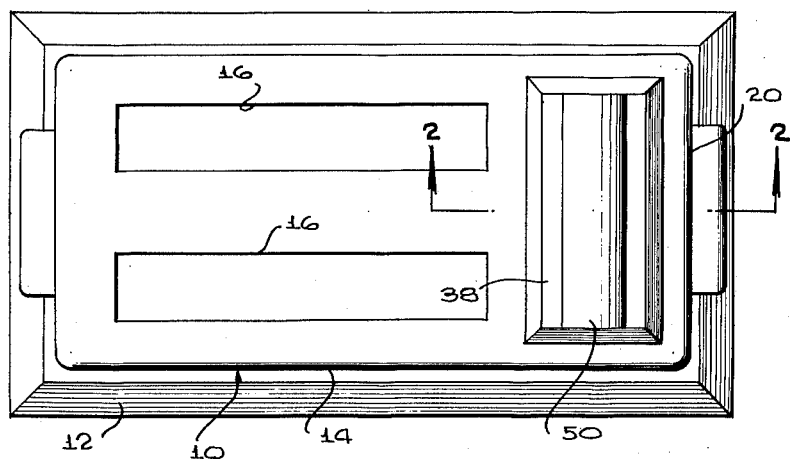
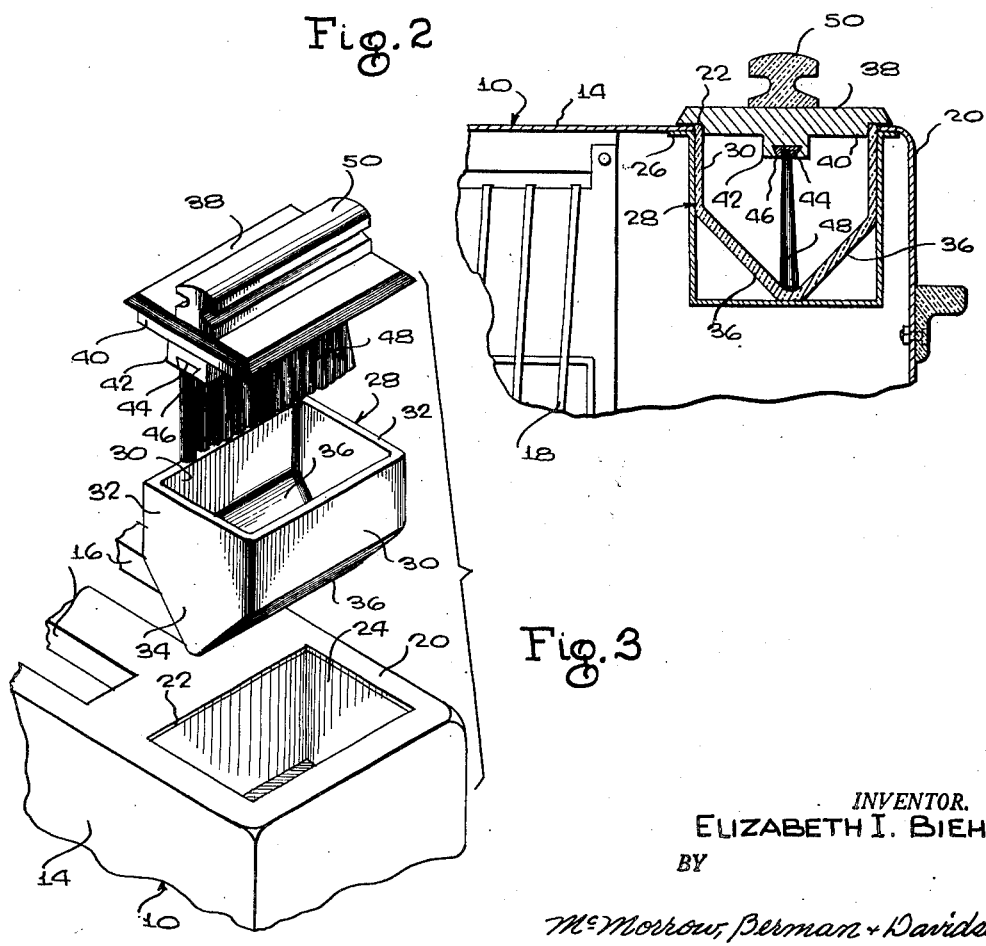
INVENTOR.
ELIZABETH I. BIEHLS
BY
McMorrow, Berman & Davidson
ATTORNEYS Patented May 26, 1953

2,639,658

UNITED STATES PATENT OFFICE 2,639,658

BUTTER MELTING AND APPLICATOR UNIT FOR BREAD TOASTERS

Elizabeth I. Biehls, Erie, Pa.

Application April 4, 1952, Serial No. 280,611

3 Claims. (Cl. 99—339)

This invention relates to bread toasters, particularly electric, automatic toasters, and the broad object of the present invention is to provide, in association with the conventional toasting mechanism of a device of this type, a butter melting and applicator unit.

It is well appreciated by householders that the application of butter to bread, after the toasting thereof, is attended by a certain amount of inconvenience, in many instances, due to the fact that the butter is of too solid a consistency to permit the ready spreading thereof upon the toast.

It has been proposed, heretofore, to provide means for preventing refrigerated butter from becoming too hard, said means usually being associated with an electric refrigerator. However, to my knowledge there has not previously been devised a unit intended specifically for incorporation in a conventional bread toaster, said unit being adapted to receive heat produced during the toasting of the bread, in such a manner as to melt a quantity of butter, thereby to reduce said butter to a liquid or semi-liquid state, thus to facilitate the spreading of the butter upon the toast.

The main object of the present invention is to provide a unit of the type stated, so that the toasting of the bread will be accompanied by a simultaneous reduction of a quantity of butter to a state that will allow its application to the bread as soon as the bread has been fully toasted.

Another important object is to provide a unit of the character referred to which will include a removable cover, that will serve to retain heat within the unit when the butter is being melted, and that will also be provided with a depending series of bristles that will be immersed in the melted butter, thereby to permit the cover to be grasped as a handle and be used as a brush during the application of the butter to the toast.

Yet another object of importance is to provide a butter melting and applicator unit as described which, when associated with a bread toaster of otherwise conventional design, will be attractive in appearance and will be conveniently positioned for application to the toast of a quantity of melted butter contained within the unit.

Still another object is to provide a unit of the character described which will be so designed as to permit the several component parts thereof to be separated from one another whenever desired, thus to facilitate the cleaning of said parts.

Yet another object is to provide a buttermelting and applicator unit for bread toasters which will be so designed as to be particularly adapted to receive the heat emanating from the ordinary resistance elements provided in a toaster, thus to melt the butter efficiently and rapidly.

A still further object is to provide a unit for melting and applying butter which will be so designed as to increase the cost of manufacture of the toaster only to a minor extent, considering the decided benefits to be obtained from use of the unit.

Summarized briefly, the invention includes, in combination with an otherwise conventional bread toaster, a well recessed within the body of the toaster in close proximity to the resistance element of the toaster; a receptacle removably seated in the well, the receptacle having downwardly converging bottom wall portions that cooperate to form a depression extending longitudinally and centrally of the receptacle, into which butter can flow when melted, said bottom wall portions being related angularly to the bottom of the well to define, between the receptacle and well, heat retaining spaces; and a removable cover for the receptacle, the cover constituting a handle when butter is to be applied to toasted bread, and being provided with a depending series of bristles, the lower ends of which are immersed in butter contained within said depression.

Other objects will appear from the following description, the claims appended thereto, and from the annexed drawings, in which like reference characters designate like parts throughout the several views, and wherein:

Figure 1 is a top plan view of a bread toaster having a unit formed in accordance with the present invention associated therewith;

Figure 2 is a sectional view taken on the line 2—2 of Figure 1, on an enlarged scale; and Figure 3 is an exploded perspective view of the invention, the toaster body being illustrated only fragmentarily.

In the drawings, I have illustrated a bread toaster designated generally by the reference numeral 10. The toaster includes a hollow body, mounted upon a suitable base, the base being designated by the reference numeral 12 and the body by the numeral 14. Formed in the top wall of the body are parallel, elongated openings 16 into which pieces of bread, not shown, can be inserted, and within the body there are mounted one or more heating elements 18.

All this is conventional construction in a bread toaster of the automatic, electric type, and does not, per se, constitute part of the present invention.

However, in accordance with the present invention, the body 14 is elongated so as to extend beyond one end of the openings 16, the extended portion of the body being designated by the reference numeral 20 and being formed, in its top wall, with a rectangular opening 22 extending transversely of the openings 16, in close proximity to one end of said openings.

Fixedly mounted within the body extension 20 is a rectangular well 24, said well having vertical side and end walls, and a horizontal bottom wall, the well being formed at its upper end in such a manner as to be completely open at said upper end. The open upper end of the well 24 is in registration with the opening 22, and is formed with a peripheral, outwardly directed flange 26 fixedly secured, in any suitable manner, to the under side of the top wall of the body extension 20.

As will be noted from Figure 2, the well 24 is disposed in close proximity to the heating element or elements 18, and preferably, the well would be formed of a material having a high thermal conductivity rating.

Removably seated within the well is a receptacle designated generally by the reference numeral 28, said receptacle being formed, preferably, of glass.

The receptacle 28 is formed with side walls 30, the upper edges of which are flush with the top surface of the body extension 20, said side walls being approximately half the width of the side walls 24 of the well, against which they are snugly engaged.

The receptacle 28 further includes vertical end walls 32, positioned against the end walls of the well, the end walls 32 being integrally formed with lower end portions 34 each of which is in the shape of an inverted isosceles triangle.

Completing the formation of the receptacle 28 are bottom wall portions 36, said portions 36 being integrally joined, at their opposite ends, to the respective side edges of the lower end portions 34. The respective portions 36, as will be noted from Figure 2, are extended downwardly from the lower edges of the side walls 30 in downwardly converging relation, meeting along a line extending longitudinally and centrally of the well 24 and its associated receptacle, said portions 36 engaging against the bottom wall of the well along their meeting line.

A cover for the unit has been designated by the reference numeral 38, and can be of molded plastic or similar material, said cover being flat and having beveled edges, the edge portions of the cover seating upon the top surface of the extension 20 of the body 14.

The cover 38 is integrally formed, on its under side, with a depending portion 40 of rectangular shape, said portion cooperating with the edges of the cover to form flanges whereby the cover may be aligned with the opening 22 and whereby, further, the cover may be removably seated in said opening.

Integrally formed upon the depending portion 40 of the cover, and extending longitudinally and centrally of the under side of the cover, is a depending rib 42, said rib being provided with a longitudinal, dove-tailed groove 44.

Slidably insertable in the groove 44, and removable from the groove, whenever desired, is a bristle retaining body 46 that extends the length of the groove, said body being shaped cross sectionally to complement the groove.

The body 46 is provided with a depending series of bristles 48, said bristles being embedded at their upper ends in the body, and being arranged to extend longitudinally and centrally of the receptacle 28. The bristles 48, as will be noted from Figure 2, are so proportioned as to length as to seat, at their lower ends, in the depression defined by the downwardly converging side portions 36 of the receptacle bottom. Thus, the lower ends of the bristles will be automatically immersed in a quantity of butter, not shown, that is melted within the receptacle, whenever the cover 38 is in its receptacle-closing position.

Integral or otherwise made rigid with the cover 38, and extending upwardly from the cover, is a handle 50, said handle extending longitudinally and centrally of the cover as best shown in Figures 1 and 3.

It will be noted that the receptacle construction is such that a quantity of butter deposited therein will, as it melts, flow from the sides, toward the center, of the receptacle, into the longitudinal and centrally disposed depression defined by the downwardly converging side portions 36. Since the lower ends of the bristles are positioned in said depression, said bristles will be automatically immersed in the melted butter, and thus, when the bread has been fully toasted, the user need only grasp the handle 50 and remove the cover 38 from its receptacle-closing position, thus to apply the butter retained by the bristles to the toasted bread.

It is believed to be of importance, in this connection, that the relative formation and arrangement of the receptacle 28 and well 24 is such as to define open spaces of triangular cross section between the bottom wall of the well and the side portions 36 of the receptacle bottom. Heat conducted through the walls of the well 24, as will be noted, will pass into said open spaces, thus to effectively heat the receptacle bottom and melt the butter contained within the receptacle.

It is also considered to be an important characteristic of the invention that the butter is melted by the same element that is being used to toast the bread, the toasting of the bread and the melting of the butter being accomplished simultaneously. Still further, it is considered to be an important feature of the construction that the melting and applicator unit is conveniently disposed, so that the user can remove the bread with one hand, while grasping the handle 50 in the other hand, and thereby spread the butter with complete ease and facility.

It is believed clear that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation, and the means presently devised to carry out said principles, it being considered that the invention comprehends any minor changes in construction that may be permitted within the scope of the appended claims.

What is claimed is:

1. The combination, with a bread toaster having a heat-producing element, of a melting and applicator unit for butter comprising; a rectangular well having a horizontal bottom wall and recessed within said toaster in sufficiently close proximity to the heat-producing element as to be heated thereby during the operation of the toaster; a receptacle adapted to retain a quantity of butter and removably seated in the well, for melting of the butter on heating of the well, the receptacle having a bottom wall including downwardly converging side portions meeting along a line extending longitudinally and centrally of the receptacle to provide a central depression in the receptacle arranged for flowing of the melted butter thereinto, said side portions seating against the bottom wall of the well at their meeting line and being angularly related to said bottom wall of the well to form open spaces of triangular cross section between the respective side portions and said bottom wall into which heat can flow; a removable cover for the receptacle; and an applicator brush connected to the under side of the cover and depending therefrom within the receptacle, said brush being aligned with and extending fully to the bottom of said depression for immersion of the lower end of the brush within said quantity of butter, during the melting of the butter within the receptacle.

2. The combination, with a bread toaster having a heat-producing element, of a melting unit for butter comprising: a rectangular well having a horizontal bottom wall and recessed within said toaster in sufficiently close proximity to the heat producing element as to be heated thereby during the operation of the toaster; a receptacle adapted to retain a quantity of butter and removably seated in the well, for melting of the butter on heating of the well, the receptacle having a bottom wall including downwardly converging side portions meeting along a line extending longitudinally and centrally of the receptacle to provide a central depression within the receptacle arranged for flowing of the melted butter thereinto, said side portions seating against the bottom wall of the well at their meeting line and being angularly related to said bottom wall of the well to form open spaces of triangular cross section between the respective side portions and said bottom wall into which heat can flow; and a removable cover for the receptacle having means extending peripherally thereof adapted for engaging the upper end edge of said receptacle.

3. The combination, with a bread toaster having a heat-producing element, of a melting unit for butter comprising: a rectangular well having a horizontal bottom wall and recessed within said toaster in sufficiently close proximity to the heat-producing element as to be heated thereby during the operation of the toaster, said well having vertical side and end walls; a receptacle adapted to retain a quantity of butter and removably seated in the well for melting of the butter on heating of the well, the receptacle having a bottom wall including downwardly converging side portions meeting along a line extending longitudinally and centrally of the receptacle to provide a central depression in the receptacle arranged for flowing of the melted butter thereinto, said side portions seating against the bottom wall of the well at their meeting line and being angularly related to said bottom wall of the well to form open spaces of triangular cross section between the respective side portions and said bottom wall into which heat can flow, said receptacle including vertical side and end walls disposed in contact throughout the areas thereof with the side and end walls, respectively, of the well; and a removable cover for said receptacle having means extending peripherally thereof engageable with the periphery of the receptacle at the upper ends of the vertical side and end walls of said receptacle.

ELIZABETH I. BIEHLS.

References Cited in the file of this patent

UNITED STATES PATENTS

| Number | Name | Date |
|---|---|---|
| 221,845 | Miller | Nov. 18, 1879 |
| 562,134 | Haner | June 16, 1896 |
| 1,086,676 | Linscott | Feb. 10, 1914 |
| 1,570,447 | Murphy | Jan. 19, 1926 |
| 1,666,335 | Lentz | Apr. 17, 1928 |
| 2,014,595 | Simmons | Sept. 17, 1935 |

FOREIGN PATENTS

| Number | Country | Date |
|---|---|---|
| 266,356 | Switzerland | Apr. 17, 1950 |